Figure 1:
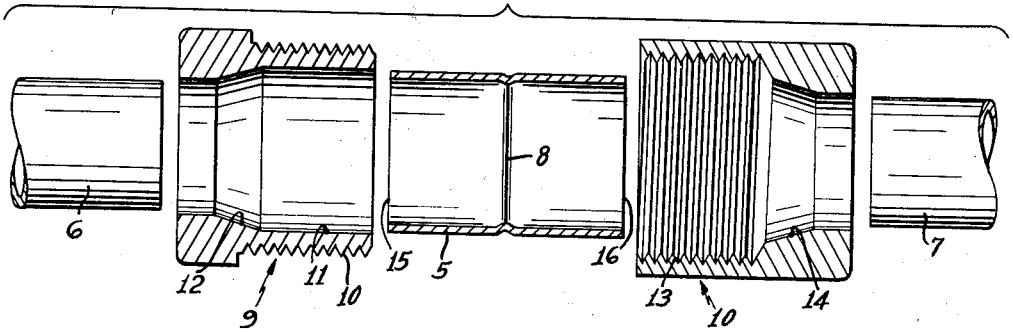

Aug. 24, 1954    H. E. VOEGELI    2,687,316
FITTING FOR JOINING TUBING
Filed March 15, 1951

INVENTOR
Henry E. Voegeli
BY
Pennie Edmonds Morton Barrows & Taylor
ATTORNEYS

Patented Aug. 24, 1954

2,687,316

UNITED STATES PATENT OFFICE 2,687,316

FITTING FOR JOINING TUBING

Henry E. Voegeli, West Cheshire, Conn., assignor to The American Brass Company, a corporation of Connecticut Application March 15, 1951, Serial No. 215,811

1 Claim. (Cl. 285—126)

This invention relates to a fitting for joining two lengths of tubing. The new fitting is of the compression type, and makes use of a cylindrical sleeve of substantially uniform wall thickness and a pair of coupling members having conically tapered interior constriction surfaces which, when the coupling members are drawn together against the sleeve, compress both ends of the sleeve circumferentially into mechanically strong fluid-tight engagement with the lengths of tubing to be joined. The invention also includes within its scope a joint assembly made with the new fitting between two lengths of tubing.

Compression fittings heretofore devised commonly make use of a long tapered sleeve of non-uniform wall thickness, together with coupling elements designed to compress the sleeve uniformly throughout substantially its entire length against the end portions of the length of tubing to be joined. The lengthy bearing surfaces of such tapered sleeves must be quite accurately machined, and a large force must be exerted in order to compress them into effective fluid-tight engagement with the tubing to which they are applied. Further, such fittings have been found practical for use only in connection with the smaller sizes of tubing in common use, i. e. tubing of less than one-half inch outside diameter. Compression-type joint fittings utilizing two sleeves or rings that are compressed at their ends immediately adjacent to the adjoining ends of the lengths of tubing have been applied to larger diameter tubing, but are undesirably complex in structure and frequently require the use of a gasket to form an effective seal. Moreover, they must be applied with considerable care or the joint is likely to be either mechanically weak, or leaky, or both. Because of the practical difficulty of making a satisfactory joint between two lengths of tubing with any of the compression-type fittings heretofore designed, the common practice for joining such tubing has been to use a fitting that is soldered or sweated to the end portions of the two lengths of tubing to be joined, or to employ a fitting that requires the ends of the tubing to be flared outwardly to secure the fitting to the tubing.

The fitting provided by the present invention overcomes the disadvantages inherent in the joint fittings heretofore devised for the larger sizes of tubing. It comprises a sleeve of uniform wall thickness and of inside diameter such as to fit snugly over the end portions of the lengths of tubing to be joined. Advantageously, the sleeve is provided, midway between its ends, with an internal annular rib of inside diameter less than the outside diameter of the tubing, so that each length of tubing can be inserted only about half way into the sleeve. The fitting further comprises a pair of coupling members each formed interiorly with a conically tapered constriction surface which at its larger end is of inside diameter at least as great as the outside diameter of the sleeve, and which at its smaller end is of inside diameter appreciably less than the outside diameter of the sleeve but at least as great as the outside diameter of the tubing to be joined. Means are provided for drawing the pair of coupling members tightly together with the sleeve positioned between them so that each of its ends is in engagement with one of said tapered constriction surfaces. Most advantageously such means are provided by forming one of the coupling members with a male thread and forming the other coupling member with a mating female thread, the combined length of the two coupling members in relation to the sleeve being such that they can be screw-threaded together with the sleeve in position between them.

By drawing the two coupling members tightly against the ends of the sleeve, with the sleeve overlying the adjoining end portions of the two lengths of tubing to be joined, the ends of the sleeves are compressed circumferentially by the tapered constriction surfaces of the coupling elements into fluid-tight engagement with the walls of the tubing at points an appreciable distance back from the adjoining ends thereof, so that a mechanically strong fluid-tight joint is formed between them. Preferably the force with which the coupling members are drawn together is sufficient so that the compressed ends of the sleeve indent the tubing walls circumferentially, thereby assuring a high degree of mechanical strength and fluid tightness in the resulting joint assembly.

The relatively small bearing area of the outer end portions of the sleeve, combined advantageously with a relatively long tapered constriction surface on the coupling members, permits great compression and sealing pressure to be exerted on the sleeve with relatively little force applied by wrenches or other means for drawing the coupling members together. The new joint fitting is simple and inexpensive in design, has no critical tolerances, and requires no machining of the sleeve and only simple machining operations to make the coupling members. In actual use it has been found easy to apply and eminently suitable for use on tubing of a wide range of sizes, including tubing of the larger sizes for which compression fittings heretofore known have been rather unsatisfactory.

Figure 2:
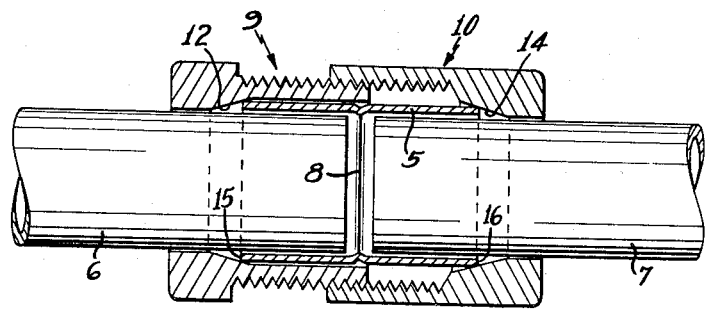
Figure 3:
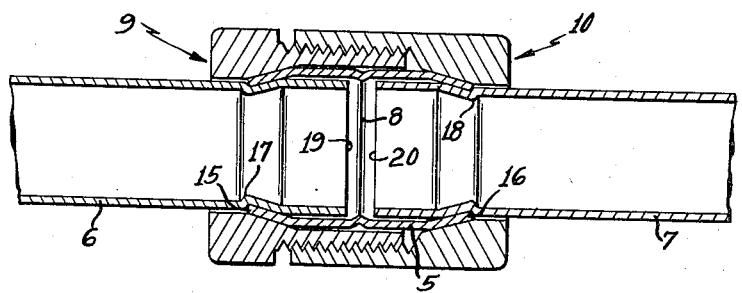

An advantageous embodiment of the invention is particularly described below with reference to the accompanying drawings, in which Fig. 1 is a longitudinal section through the unassembled parts of the fitting;

Fig. 2 is a longitudinal section through the fitting with the parts assembled preparatory to tightening; and Fig. 3 is a longitudinal section through the joint assembly after the fitting has been fully tightened.

The new fitting comprises a cylindrical sleeve 5 of copper, bronze, brass, or other ductile metal. The inside diameter of the sleeve is very slightly larger than the outside diameter of the lengths of tubing 6 and 7 to be joined, so that it may be fitted snugly over the end portions thereof, as shown in Fig. 2. The sleeve 5 is of uniform wall thickness throughout its length, and may be made simply by cutting it from a length of tubing of the correct size. Advantageously it is indented circumferentially midway between its ends to form an internal annular rib 8 of inside diameter slightly less than the outside diameter of the tubing. Provision of the rib 8 assures proper centering of the sleeve 5 on the end portions of the lengths of tubing when the parts are assembled together.

A pair of coupling elements 9 and 10 complete the fitting. One of these fittings 9 is in the form of a nipple provided with male threads 10. The nipple is formed over a substantial part of its length with a cylindrical bore 11 of diameter only slightly larger than the outside diameter of the sleeve 5. The nipple further is formed with an internal conically tapered constriction surface 12 joining at its large diameter end with the cylindrical bore 11, and of inside diameter at its small end just slightly larger than the outside diameter of the tubing. The exterior surface of the nipple 9, except where it is threaded, is advantageously of hexagonal cross-section to provide flat surfaces that may be gripped by a wrench.

The other coupling member 10 is generally similar to the nipple 9, except that it is in the form of a nut provided with female threads 13 of the correct size to mate with the nipple threads 10. It likewise is formed with an internal conically tapered constriction surface 14, similar to the corresponding surface 12 of the nipple. At its large end, the diameter of the conical constriction 14 is at least as large as the outside diameter of the sleeve 5, and at its small end its diameter is appreciably less than the outside diameter of the sleeve but is at least as great as the outside diameter of the tubing. The exterior surface of the nut 10, like the unthreaded part of the nipple, is advantageously hexagonal in cross section so that a wrench can grip it easily.

The new fitting is assembled as shown in Fig. 2. The nipple 9 and the nut 13 are first slipped over the respective ends of the two lengths of tubing, and the end portions of the tubing are then inserted into the sleeve 5. Next the coupling members are brought toward each other and are screwed together until the tapered constriction surfaces 12 and 14 engage respectively with the ends 15 and 16 of the sleeve. Finally, the coupling members are screwed tightly together, using wrenches with sufficient force so that the ends 15 and 16 of the sleeve are circumferentially compressed by the constriction surfaces 12 and 14 tightly against the walls of the two lengths of tubing 6 and 7. Preferably the coupling members are tightened sufficiently so that the compressed ends of the sleeve circumferentially indent the walls of the tubing as indicated at 17 and 18. Thereby a mechanically strong fluid-tight joint is formed between the two lengths of tubing.

In the joint assembly formed with the new fitting, the compressed ends 15 and 16 of the sleeve engage the walls of the lengths of tubing 6 and 7 an appreciable distance back from their adjoining ends 19 and 20. Consequently the sleeve securely holds the two lengths of tubing together. Also, it will be noted that the only seals on which the fluid-tight integrity of the joint depends are those between the compressed end portions of the sleeve and the outside surfaces of the walls of the tubing. When the sleeve 5 is made of a ductile metal, no difficulty is experienced in producing a fluid-tight seal at these points; and the permanence of the seals is assured by the compressive force continually exerted on the compressed ends of the sleeve by the engaging coupling members.

As an example of this invention, a joint for pressure testing was made with a fitting of the character described between two lengths of copper tubing. The fitting employed for this test joint comprised a sleeve made from copper tubing and machined brass coupling members. The joint safely withstood 250 pounds per square inch of nitrogen gas pressure and 4000 pounds per square inch of oil pressure, both without leakage. This joint was then subjected to lengthwise tension and withstood without creeping a pull equivalent to an internal pressure of nearly 12,000 pounds per square inch.

Joints may be made in accordance with the invention between lengths of tubing of copper or other metals used for conveying water, oil, or gas in air conditioning and refrigeration systems, radiant panel heating systems, hot and cold water plumbing systems, and the like. The new joint fitting is much simpler to apply than soldered fittings or fittings that require flaring the ends of the tubing, and may be assembled with no other tools than conventional wrenches. It lends itself admirably to joining lengths of hard drawn tubing, whereas fittings which require flaring the ends of the tubing can be used only on soft annealed tubing unless the makeshift method of annealing the ends of the tubing with a torch is employed. Notwithstanding the simplicity of the new fitting and the ease with which it is installed, joints made with its use between lengths of tubing are substantially equal in mechanical strength and fluid tightness to the best joints made with soldered or flared-tube fittings.

I claim:

A fitting for joining two lengths of tubing comprising a substantially cylindrical, circumferentially-continuous metallic sleeve of uniform wall thickness throughout substantially its entire length and of inside diameter such as to fit snugly over the joining end portions of the lengths of tubing to be joined, said sleeve being formed at its mid-section with an internal annular rib of less inside diameter than the outside diameter of the tubing lengths to be joined, whereby each of said lengths may be inserted only about half way into said sleeve, an externally threaded male coupling member formed throughout a substantial portion of its length with a cylindrical bore of inside diameter such as to fit snugly over one end of said sleeve, said coupling member also being formed interiorly with a conically tapered constriction surface joining at its large-diameter end with said cylindrical bore and being at its small-diameter end of inside diameter appreciably less than the outside diameter of said sleeve but large enough to fit snugly over the end portion of one of the lengths of tubing to be joined, and a female coupling member internally threaded to mate with said male coupling member, said female coupling member being formed interiorly with a conically tapered constriction surface similar to that of said male coupling member, the inside diameter of said smaller-diameter end of the tapered surfaces exceeding the outside diameter of the tubing by an amount less than twice the wall thickness of said sleeve, whereby when said sleeve is slipped over the adjoining end portions of the lengths of tubing to be joined and when said coupling members are positioned with their tapered constriction surfaces engaging the ends of said sleeve and with their threads engaging and when said coupling members are screwed together sufficiently to force the ends of the sleeve to the smaller-diameter end of the conically-tapered surfaces of the coupling members, the ends of said sleeve are circumferentially compressed and indented into the walls of the lengths of tubing to be joined at points an appreciable distance back from the adjoining ends thereof and a mechanically strong substantially fluid-tight joint is formed between them.

References Cited in the file of this patent

UNITED STATES PATENTS

| Number | Name | Date |
|---|---|---|
| 2,463,407 | Melton | Mar. 1, 1949 |
| 2,473,119 | Wolfram | June 14, 1949 |

FOREIGN PATENTS

| Number | Country | Date |
|---|---|---|
| 378,898 | Great Britain | Aug. 8, 1932 |
| 572,001 | Great Britain | Sept. 18, 1945 |